United States Patent [19]

Jang et al.

[11] 4,389,229
[45] Jun. 21, 1983

[54] METHODS AND APPARATUS FOR FABRICATING A LIGHTGUIDE PREFORM

[75] Inventors: Sei-Joo Jang, Lawrence Township, Mercer County; Knut D. Pohl, Raritan Township, Hunterdon County; Mansoor A. Saifi, East Windsor Township, Mercer County, all of N.J.

[73] Assignee: Western Electric Co., Inc., New York, N.Y.

[21] Appl. No.: 307,455

[22] Filed: Oct. 1, 1981

[51] Int. Cl.³ ............................................. C03B 19/00
[52] U.S. Cl. ...................................... 65/3.12; 65/18.2; 65/29; 65/161; 118/692; 118/730
[58] Field of Search ................. 65/3.12, 18.2, 29, 157, 65/158, 160, 161; 118/692, 730; 427/8, 163, 232, 235, 237, 238

[56] References Cited

U.S. PATENT DOCUMENTS

| | | | |
|---|---|---|---|
| 3,250,263 | 5/1966 | Gerjets | 123/573 |
| 3,712,733 | 1/1973 | Giaimo, Jr. | 355/16 X |
| 3,890,921 | 6/1975 | Szczepanski | 118/301 X |
| 3,925,050 | 12/1975 | Kushihashi et al. | 65/181 X |
| 3,956,532 | 5/1976 | Russell | 423/237 X |
| 4,123,244 | 10/1978 | Leclercq | 118/326 X |
| 4,125,391 | 11/1978 | Van Laethem | 427/109 X |
| 4,217,027 | 8/1980 | MacChesney et al. | 65/3.12 X |
| 4,233,045 | 11/1980 | Sarkar | 65/12 X |
| 4,278,459 | 7/1981 | Partus | 65/13 X |
| 4,280,829 | 7/1981 | Sheth | 65/158 |

OTHER PUBLICATIONS

Okada et al., "Improved Chemical Vapour Deposition Method . . . ", Electronic Letters, vol. 14, No. 4, Feb. 16, 1978, pp. 89-90.

Primary Examiner—Richard V. Fisher
Attorney, Agent, or Firm—D. J. Kirk

[57] ABSTRACT

Undeposited reactants (i.e., soot) passing through a glass substrate tube (12), during the fabrication of a lightguide perform by the Modified Chemical Vapor Deposition (MCVD) process, flow into a reactant exhaust system (50) and are carried therethrough by a uniformly flowing reactant-free gas. The reactants pass through an exhaust tube (52), a reactant collection chamber (54), through a pressure control apparatus (56;114) and into a gas scrubber. The pressure within the exhaust system (50) is maintained substantially constant during the MCVD process by continuously monitoring the pressure therein and adjusting the pressure control apparatus (56;114) accordingly. Additionally, a continuous, uniform flow of soot-free gas is directed into the exhaust system to assist in the removal of the undeposited reactants therefrom.

10 Claims, 5 Drawing Figures

Section A-A

METHODS AND APPARATUS FOR FABRICATING A LIGHTGUIDE PREFORM

TECHNICAL FIELD

The instant invention relates to techniques for fabricating lightguide preforms. In particular, the invention is directed to methods and apparatus for depositing reactants on the inside surface of a glass tube to form such preforms.

BACKGROUND OF THE INVENTION

Lightguide fiber is drawn from a solid glass cylinder, or preform. The preform, having a central core surrounded by a cladding material, may be fabricated by the modified chemical vapor deposition (MCVD) process described in U.S. Pat. No. 4,217,027 which issued on Aug. 12, 1980 and which is incorporated herein by reference. Layers of doped silica are built-up on the inside of an elongated silica glass substrate tube by the reaction of glass precursor vapors, resulting in the formation of particles which deposit on and are fused to the inner wall of the tube. The composition of the precursor vapors is automatically controlled to give a step or graded index of refraction in the deposited glass layers which will form the core of the preform. When a fiber is drawn from the preform, the deposited silica glass becomes the lightguide fiber core and the silica glass tube becomes the fiber cladding.

In particular, vapors of material such as $GeCl_4$, $SiCl_4$, $POCl_3$ or the like are entrained in a carrier gas such as oxygen and are directed, as a reactant vapor stream, into the interior of the glass tube which is rotated as an oxy-hydrogen torch repeatedly traverses its length. As the vapor stream passes through the tube and encounters a heat zone adjacent the torch it reacts, creating oxides which deposit on the interior surface of the tube. After numerous traversals of the torch along the length of the tube to deposit said layers, the tube is then subjected to elevated temperatures (e.g., 1900° to 2000° C.) by the torch in several traversals to shrink the tube and in a final traversal the tube is collapsed, resulting in a solid cylindrical rod shaped preform.

During this process not all of the reaction products are deposited within the preform tube but are exhausted from the tube in a powdery form along with exiting carrier gas. Heretofore these undeposited reaction products (i.e., soot) have been conveyed from the preform tube through a reactant collection tube formed as an integral extension of the preform tube. Gases and reactants passing through the collection tube are directed into a gas scrubber.

During the vapor deposition process, however, which ordinarily lasts for several hours, some of the soot exhausted from the preform tube deposit on and accumulate within the collection tube. This accumulation forms a progressively increasing restriction to the flow of fluids and other reaction products later passed through the collection tube which, in turn, affects the pressure of the vapor stream within the preform tube itself. Small changes in pressure and flow pattern at the exit end of the preform tube can substantially affect the deposition process as it is imperative that the vapors be delivered through the preform tube at precisely controlled mass flow rates. Thus, this progressively increasing restriction and changes in flow pattern within the exhaust tube adversely affects the deposition process within the preform tube since it is unpredictable and uncontrolled.

It is well known to place a cylindrical silica scraper rod inside the reactant collection tube. During rotation of the collection tube the rod agitates and shakes loose some of the reaction products that have deposited and accumulated on the interior walls thereof, thereby enabling the reaction products to be withdrawn by the vapor stream into the scrubber. Additionally, the scraper rod may be periodically moved about in both axial and radial directions in order to further clean the inside of the collection tube by scraping the powdery product that may have accumulated at the throat area where the collection tube is joined to the preform tube as well as in the collection tube itself. Such a technique provides improved results, however, it has not prevented some reaction product from accumulating and deleteriously affecting the deposition process. Even when agitated the products tend to diffuse upstream to some degree creating anomalies in the deposited layers within the preform tube.

Accordingly, there is a need for methods and apparatus for exhausting reaction products from lightguide preform tubes during layer deposition therein while providing a substantially uniform flow pattern and constant pressure at the exhaust end of the preform tube.

SUMMARY OF THE INVENTION

The foregoing problems have been overcome by the instant method of fabricating a lightguide preform wherein reactants entrained in a carrier gas are directed into the upstream end of a preform tube for chemical reaction to form a glassy soot deposition therein, a portion of the reactants not depositing in said tube and exiting from the downstream end of said tube, the method comprising the steps of directing the undeposited soot into a soot exhaust system communicating with the downstream end of said tube, said system having a variable size outlet port; measuring pressure within the system; and varying in the size of the outlet port in accordance with the measured pressure to maintain a substantially constant pressure within the soot exhaust system.

Additionally, a continuous, uniform flow of soot-free gas is directed into the exhaust system to remove the undeposited reactants therefrom.

DETAILED DESCRIPTION

An exemplary embodiment of the instant invention is described as it relates to the hereinbefore referred to MCVD process. However, such description is for purposes of exposition and not for limitation. The instant technique is applicable to any lightguide preform fabrication process wherein a stream of reactants entrained in a carrier gas are directed into the bore of a glass tube for deposition therein, wherein a portion of the reactants exit the tube.

Figure 1:
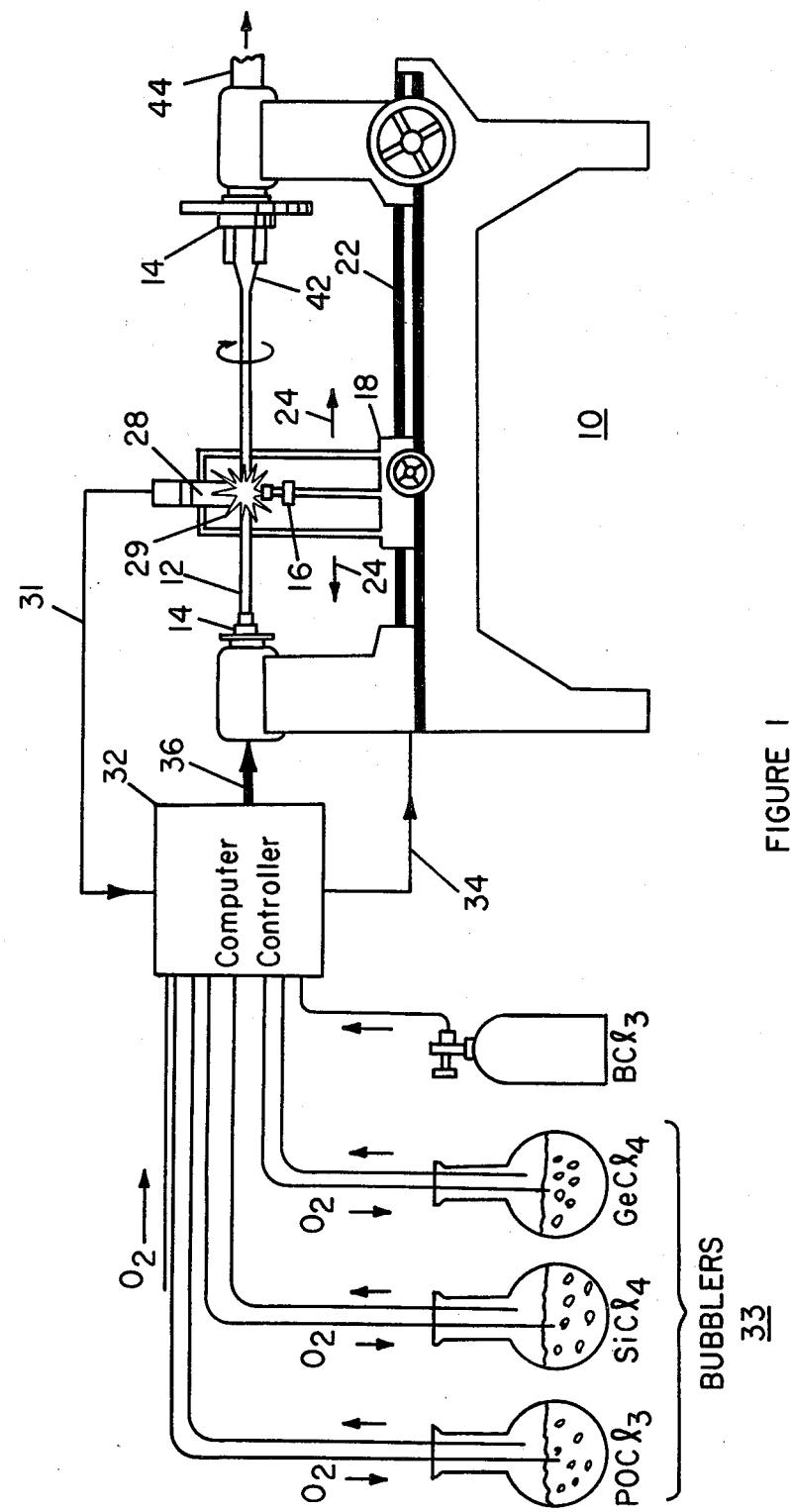
FIG. 1 is a schematic drawing of an MCVD lightguide preform fabrication system.

FIG. 1 is a schematic drawing of a prior art apparatus used to fabricate a lightguide preform by the MCVD process. A glassworking lathe, generally referred to by the numeral 10, has a glass substrate tube 12 rotatably mounted therein between opposed chucks 14—14. A torch 16 is fastened to a support 18 which is mounted for lateral movement along a bed 22 as indicated by the arrows 24—24. Additionally, a pyrometer 28 is located on the support 18 to monitor the temperature of the portion of the tube 10 exposed to the flame 29 from the torch 16. The output of the pyrometer 28 is connected by line 31 to a computer controller 32 which has a plurality of inputs from selected gas sources, generally indicated by the numeral 33 and an output 34 to control the velocity of movement of the torch support 18.

The reactants and carrier gases are metered and mixed within the computer controller 32 in a well known manner and directed along the bore of the rotating tube 12 as indicated by the heavy arrow 36. A portion of the reactants, commonly referred to as soot, will deposit on the inside surface of the tube 12 as described in the aforementioned MCVD patent as the torch 16 moves along the outside surface thereof. The torch 16 provides a heat zone that moves slowly (e.g., 0.3 cm/sec.) from left to right, returns rapidly to the left and repeats the traversal, causing the deposition of a uniform layer of doped silica on the inside surface of the tube. A plurality of such layers are deposited to produce the proper tube-to-core mass ratio and index profile.

More than 50% of the reactants do not deposit on the inner surface of the preform tube 12 but pass therethrough and along a collection tube 42, which is fused to the end of the preform tube, and pass through a conduit 44 to a scrubber (not shown). Undesirably, a substantial portion of the undeposited reactants will accumulate within the collection tube 42. This accumulation forms a progressively increasing restriction resulting in altered fluid flow patterns and pressure fluctuations which can adversely affect the MCVD process and inhibits process repeatability as hereinbefore indicated.

Figure 2:
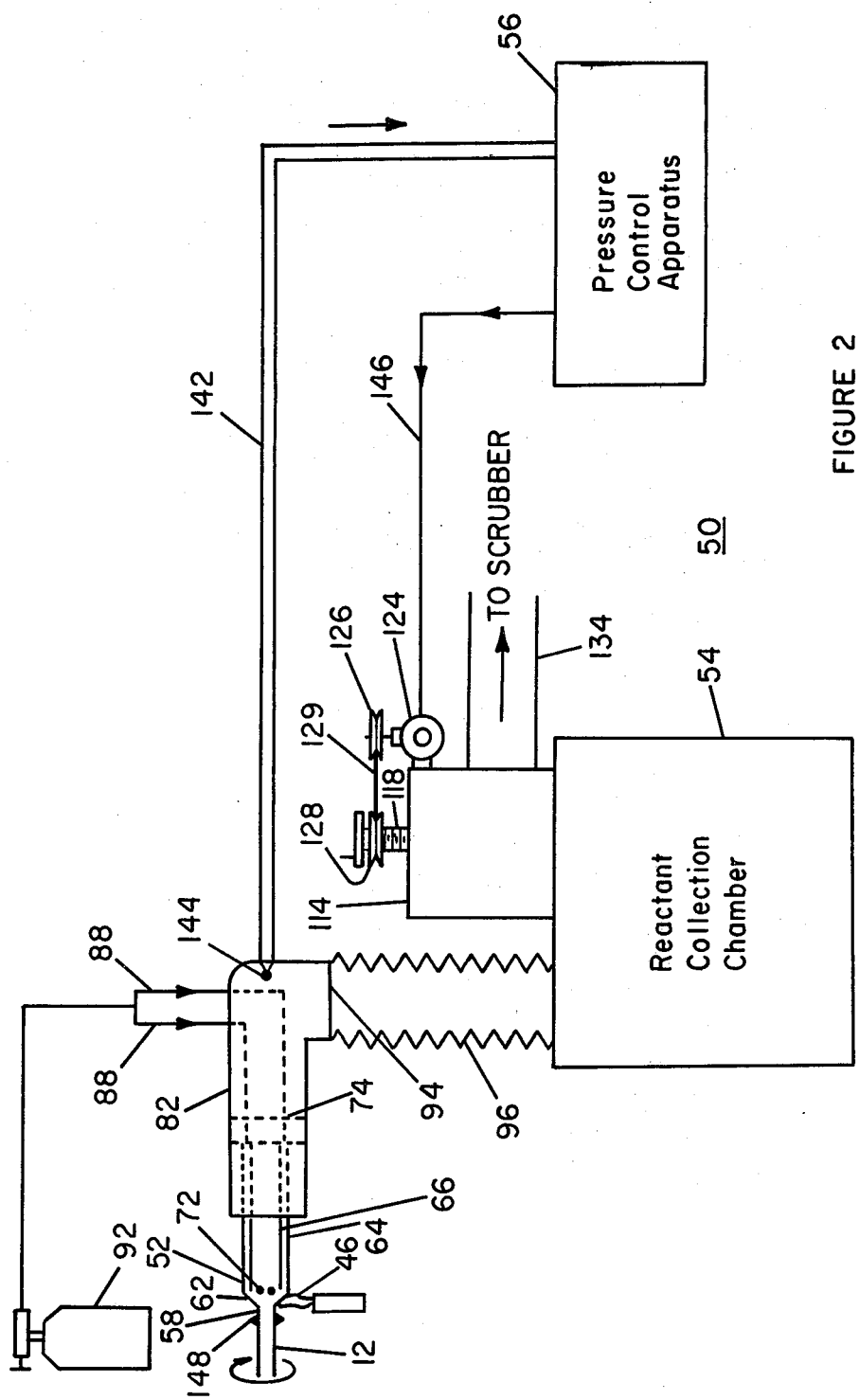
FIG. 2 is a schematic drawing of apparatus for exhausting a preform tube which embodies principles of the instant invention.

The instant exhaust apparatus, generally designated by the numeral 50 in FIG. 2, substantially overcomes the foregoing problems. The apparatus 50 is generally comprised of a double walled exhaust tube 52 (also see FIG. 3), a reactant collection chamber 54 (see FIG. 5) and a pressure control apparatus 56. The reactants are input to the tube 12 in substantially the same manner as set forth in FIG. 1.

Figure 3:
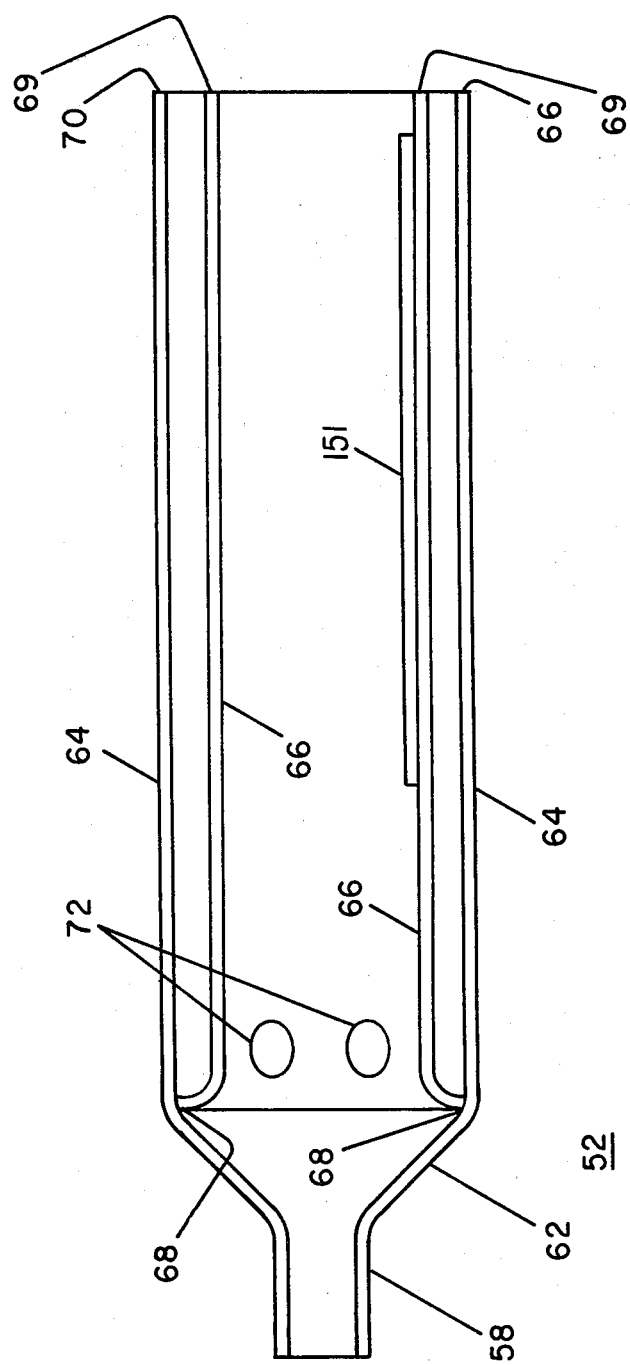
FIG. 3 is a cross-sectional view of the exhaust tube used to implement the instant invention.

The exhaust tube 52, shown in detail in FIG. 3 is a glass tube having a small diameter first end 58 which has a tapered section 62 opening to an elongated outer tube 64. An elongated smaller diameter inner tube 66 is mounted coaxially within the outer tube 64 and has a first end 68 sealably fused thereto and a second end 69 in copolanar relation to an end 70 of the outer tube. The inner tube 66 has a plurality of spaced apertures 72—72 proximate the first end 68 of the inner tube 66.

Figure 4:
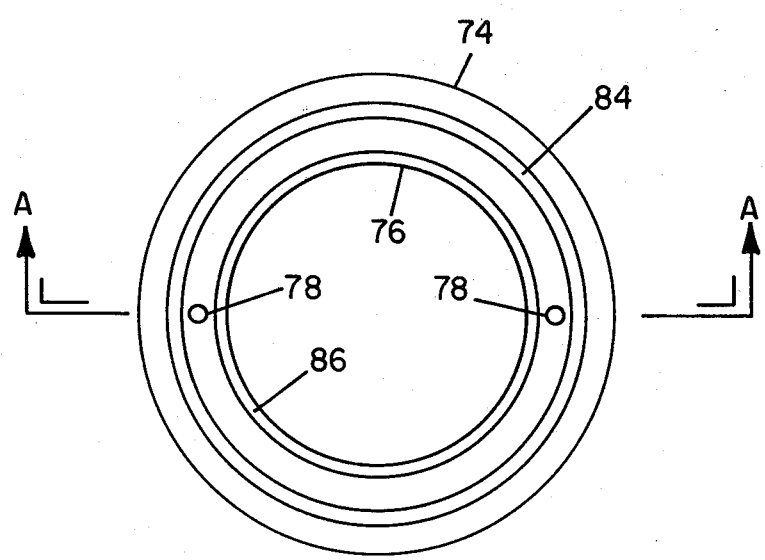
FIG. 4 depicts views of a fitting for coupling the exhaust tube a gas supply.
Figure 4:
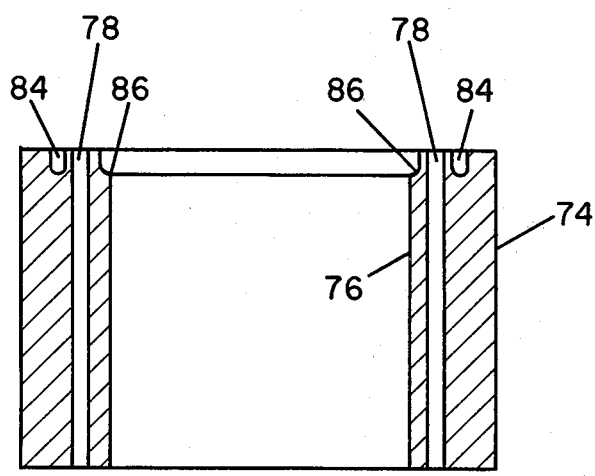

FIG. 4 shows two views of a substantially cylindrical fitting 74 having a central bore 76 with a pair of channels 78—78 passing longitudinally therethrough. The fitting 74, which may be made of Teflon polymer or the like, is fixedly mounted within a discharge housing 82 (see FIG. 2) and has first and second concentric annular grooves 84 and 86 to sealably receive the ends 69 and 70, respectively, of the exhaust tube 52 while permitting rotation thereof. A pair of conduits 88—88 (see FIG. 2) pass through the wall of the housing 82 and terminate at the channels 78—78 in the fitting 74 to connect a soot-free gas supply 92 (e.g., oxygen, nitrogen) thereto. The output end 94 of the discharge housing 82 communicates with the reactant collection chamber 54 via a flexible tube 96.

Figure 5:
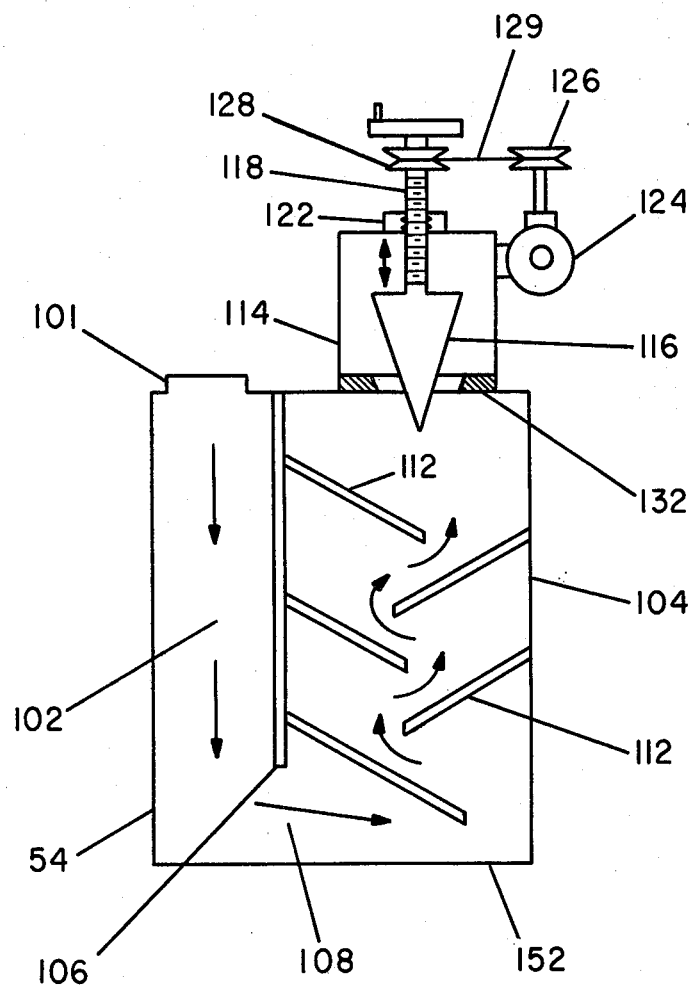
FIG. 5 is a partial cross-sectional view of a dust collector used to implement the instant invention.

The reactant collection chamber 54 is depicted in detail in FIG. 5 and has an intake 101, an open volume 102 and a muffle section 104 separated by a common wall 106 having an opening 108 in the lower portion thereof. The baffle section 104 has a plurality of downwardly disposed, interleaved plates 112—112 extending from the walls thereof. A valve housing 114 is mounted directly above the baffle section 104. The valve housing 114 has a conical member 116 mounted on a threaded shaft 118 disposed therein which passes through an internally threaded member 122. A motor 124 controls first and second pulleys 126 and 128 which are connected by a belt 129. When the motor 124 is activated the threaded shaft 118 will move towards or away from a circular opening 132 in the top of the muffle section 104. An exhaust pipe 134 (see FIG. 2) communicates between the valve housing 114 and a gas scrubber (not shown).

The pressure control apparatus 56 (see FIG. 2) has an input 142 from a pressure sensor 144 mounted within the discharge housing 82 and an output lead 146 connected to the motor 124. In a particular working embodiment the pressure control apparatus 56 was a Photohelic pressure switch/gage manufactured by Dwyer Instruments, Inc. and described in U.S. Pat. No. 3,862,416 which is incorporated by reference herein.

In operation, (see FIG. 2), the glass tube 12 is axially aligned with the small diameter first end of the exhaust tube 52 at interface 148 where they are heated and fused together. The exhaust tube 52 is then inserted within the discharge housing 82 with the concentric ends 70 and 69 positioned in the first and second annular grooves 84 and 86, respectively, of the fitting 74. The distal end of the tube 12 is positioned in a rotatable chuck 14 of a glass lathe. Gases and reactants are fed into the tube 12 and the temperature and lateral movement of the torch 16 controlled by the computer controller 32 as shown in FIG. 1. A plurality of layers of glass soot are deposited on the inside surface of the tube 12 and undeposited soot pass therethrough, as hereinbefore described. As shown in FIG. 2 a flame 46 is directed at the neck portion 62 to prevent deposition of the undeposited reactants on the inner surface of that portion of the exhaust tube 52.

The undeposited soot passing through the tube 12 flow through the first end 58 of the exhaust tube 52 into the inner tube 66. Simultaneously, oxygen from the supply 92 is caused to flow along the conduits 88—88, through the channels 78—78 in the fitting 74, along the volume defined by the outer and inner tubes 64 and 66, respectively, of the exhaust tube 52. A uniform flow of oxygen, under pressure, passes radially through the apertures 72—72 and flows along with and carries a substantial portion of the undeposited reactants through the inner tube 66, the bore 76 of the fitting 74, through the discharge housing 82 and into the reactant collection chamber 54 via the flexible tubing 96. To further improve the efficiency of the instant exhaust system a cylindrical glass rod 151 may be placed within the inner tube 66 as shown in FIG. 3. As hereinbefore indicated the rod 151 will assist in dislodging reactants that may deposit on the inside surface of tube 66.

The reactants are carried into the open volume 102 of the reactant collection box 54 (see FIG. 5) wherein heavy particulate reactant falls to the bottom surface 152 and the remaining (lighter) particulate passes into the baffle section 104 via the opening 108. The muffle section 104 with the plurality of interleaved plates 112—112 acts as a buffer region between the scrubber (not shown) and the exhaust tube 52 and presents a relatively long, serpentine path. The area between the surface of the cone 116 and the surface of the opening 132 may be adjusted under control of the apparatus 56 by activating the motor 124 to move the shaft 118 towards or away from the opening.

Accordingly, the pressure within the exhaust system 50 can be controlled by moving the cone 116 to change the cross sectional area of the opening 132 in response to the pressure sensor 144. Additionally, the pressure within the exhaust system 50 can also be adjusted by altering the oxygen flow from the supply 92 into the exhaust tube 52. Advantageously, by maintaining both a substantially constant pressure (e.g., 0.5 cm±0.02 cm of water) and oxygen flow (e.g., 1 liter/minute) within the exhaust system 50, which pressure is lower than that at the output of the tube 12, a high degree of repeatability of the refractive index of preforms has been attained. Additionally, by using a computer controlled gas reactant input system along with the instant exhaust system 50 a substantially fully automated system is provided.

Furthermore, a portion of the fine particulate reactants will also deposit on the plates 112—112. Periodically, the soot collection box 54 is opened, cleaned out and the undeposited reactants on the plates 112—112 and the bottom surface 152 are collected. These high purity and relatively expensive reactants can be chemically treated and reused.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of fabricating a lightguide preform wherein reactants entrained in a carrier gas are directed into the upstream end of a preform tube for chemical reaction to form a glassy soot for deposition therein, a portion of the soot not depositing in said tube and exiting from the downstream end of said tube, the method comprising the steps of:
    directing the undeposited soot into a soot exhaust system communicating with the downstream end of said tube, said system having a variable size outlet port;
    measuring pressure within the system; and
    varying the size of the output port in accordance with the measured pressure to maintain a substantially constant pressure within the soot exhaust system.

2. The method as set forth in claim 1, characterized by:
    directing a continuous, uniform flow of soot-free gas into the exhaust system to move the undeposited soot through the system.

3. The method as set forth in claim 2, characterized by:
    directing the soot-free gas into the exhaust system proximate the downstream end of said preform tube.

4. A method for automatically exhausting undeposited reactants passing through the exhaust end of a lightguide preform tube during the MCVD process, the method comprising the steps of:
    directing a continuous, uniform flow of oxygen between inner and outer glass tubes of a double walled exhaust tube, said exhaust tube communicating with the exhaust end of said preform tube;
    flowing the oxygen through at least one aperture in the wall of the inner tube located proximate said preform tube exhaust end;
    continuously and uniformly flowing the oxygen, with the undeposited reactants therein, through the inner tube into a reactant collection chamber to deposit a portion of the reactants therein;
    exhausting the oxygen with the remaining reactants therein through a controllable, variable opening in the collection chamber;
    continuously monitoring the pressure within said exhaust tube; and
    adjusting said variable opening in response to the monitored pressure to maintain the pressure in said exhaust tube within predetermined narrow limits.

5. An apparatus for fabricating a lightguide preform wherein reactants entrained in a carrier gas are directed into the upstream end of a preform tube for chemical reaction to form a glassy soot for deposition therein, a portion of the soot not depositing in said tube and exiting from the downstream end of said tube, the apparatus comprising:
    a soot exhaust system communicating with the downstream end of said tube to receive the undeposited soot, said system having a variable size outlet port;
    means for measuring pressure within the system; and
    means for varying the size of the outlet port in accordance with the measured pressure to maintain a substantially constant pressure within the soot exhaust system.

6. The apparatus as set forth in claim 5, comprising:
    means for directing a continuous, uniform flow of soot-free gas into the exhaust system, proximate the downstream end of said preform tube, to move the soot through the system.

7. An apparatus for fabricating a lightguide preform wherein reactants entrained in a carrier gas are directed into the upstream end of a preform tube for chemical reaction and deposition within said tube, a portion of the reactants exiting the downstream end of said tube as soot, the apparatus comprising:
    an exhaust tube having first and second ends, the first end communicating with the downstream end of said preform tube to receive the exiting reactants;
    a reactant collection chamber having an input connected to the second end of said exhaust tube and a variable opening output;
    means for introducing a continuous, uniformly flowing soot-free gas into said exhaust tube, proximate the downstream end of said preform tube, to move said reactants from the exhaust tube to the collection chamber; and
    means for sensing the pressure within said exhaust tube to control the variable opening in response thereto to maintain said pressure substantially constant during the deposition of reactants in said preform tube.

8. An apparatus for fabricating a lightguide preform wherein reactants entrained in a carrier gas are directed into the upstream end of a preform tube for chemical reaction and deposition as a glassy soot within such tube, a portion of the soot exiting the downstream end of said tube, the apparatus comprising:

an exhaust tube having first and second ends, the first end communicating with the downstream end of said preform tube to receive the exiting soot;

the exhaust tube further comprising:
(a) an outer glass tube having a first end with a diameter substantially the same as the preform tube and a second end with a diameter greater than the first end;
(b) an inner glass tube mounted within and coaxial with the outer glass tube, having a first end sealably connected to the outer glass tube proximate the first end of said outer glass tube, with a second end aligned with the second end of the outer glass tube; and
(c) the inner glass tube having a plurality of apertures therein located proximate the first end thereof;

a reactant collection chamber having an input connected to the second end of said exhaust tube and a variable opening output;

means for introducing a continuous, uniformly flowing soot-free gas into said exhaust tube, through said apertures proximate the downstream end of said preform tube, to move said soot from the exhaust tube to the collection chamber; and means for sensing the pressure within said exhaust tube to control the variable opening in response thereto to maintain said pressure substantially constant during the deposition of soot in said preform tube.

9. The apparatus as set forth in claim 8, wherein:
an elongated glass rod is positioned within the inner glass tube to loosen soot depositing on the surface of the inner glass tube.

10. An apparatus for fabricating a lightguide preform wherein reactants entrained in a carrier gas are directed into the upstream end of a preform tube for chemical reaction and deposition within said tube, a portion of the reactants exiting the downstream end of said tube, the apparatus comprising:

an exhaust tube having first and second ends, the first end communicating with the downstream end of said preform tube to receive the exiting reactants;

a reactant collection chamber, having an input connected to the second end of said exhaust tube, with a variable opening output; the chamber further comprising:
(a) a housing having an open volume section and a baffle section partially separated by a common wall having an opening therein to permit fluid communication therebetween;
(b) the open volume section is adapted to receive the flow of the exiting reactants from the exhaust tube;
(c) the baffle section having a plurality of downwardly disposed, interleaved plates extending from the walls thereof which presents a serpentine path to the flow of reactants and gas passing therethrough; and
(d) a valve located at the top of the baffle section to control the variable opening through which the flowing gas and reactants pass;

means for introducing a continuous, uniformly flowing reactant gas into said exhaust tube, proximate the downstream end of said preform tube, to move said reactants from the exhaust tube to the collection chamber; and means for sensing the pressure within said exhaust tube to control the variable opening in response thereto to maintain said pressure substantially constant during the deposition of reactants in said preform tube.

* * * * *

UNITED STATES PATENT AND TRADEMARK OFFICE
CERTIFICATE OF CORRECTION

PATENT NO. : 4,389,229

DATED : June 21, 1983

INVENTOR(S) : S. J. JANG-K. D. POHL-M. A. SAIFI

It is certified that error appears in the above—identified patent and that said Letters Patent is hereby corrected as shown below:

In the specification, Column 3, line 22, "as soot," should read --as "soot",--; line 57, "copolanar" should read --coplanar--.

In the claims, Column 5, Claim 1, line 56, "output" should read --outlet--.

Signed and Sealed this

Thirteenth Day of September 1983

[SEAL]

Attest:

GERALD J. MOSSINGHOFF

Attesting Officer

Commissioner of Patents and Trademarks